(12) United States Patent
Kuiper et al.

(10) Patent No.: US 7,724,444 B2
(45) Date of Patent: May 25, 2010

(54) OPTICAL ELEMENT, OPTICAL DEVICE, ATMOSPHERE PROVIDER, OPTICAL SCANNING DEVICE, LIGHT COUPLING DEVICE, AND METHOD OF OPERATING INTERFACIAL WAVES

(75) Inventors: Stein Kuiper, Eindhoven (NL); Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 437 days.

(21) Appl. No.: 11/577,825

(22) PCT Filed: Oct. 24, 2005

(86) PCT No.: PCT/IB2005/053465

§ 371 (c)(1),
(2), (4) Date: Apr. 24, 2007

(87) PCT Pub. No.: WO2006/046185

PCT Pub. Date: May 4, 2006

(65) Prior Publication Data

US 2009/0122388 A1    May 14, 2009

(30) Foreign Application Priority Data

Oct. 27, 2004   (EP)  .................................. 04105320

(51) Int. Cl.
*G02B 3/12*   (2006.01)
(52) U.S. Cl. ...................... 359/666; 359/665
(58) Field of Classification Search ......... 359/237–245, 359/290, 291, 665, 666
See application file for complete search history.

(56) References Cited

U.S. PATENT DOCUMENTS

| | | | |
|---|---|---|---|
| 6,369,954 B1 | 4/2002 | Berge et al. | |
| 7,230,771 B2 * | 6/2007 | Kuiper et al. | 359/665 |
| 2002/0176148 A1 * | 11/2002 | Onuki et al. | 359/253 |

FOREIGN PATENT DOCUMENTS

| | | |
|---|---|---|
| WO | 0058763 | 10/2000 |
| WO | 03069380 | 8/2003 |
| WO | 2004051323 A1 | 6/2004 |

OTHER PUBLICATIONS

Glass T R et al: "Measuring Temporal and Spatial Properties", Applied Optics USA, vol. 24, No. 16, pp. 2616-2620, 1985, XP002360328.
ISR/Written Opinion of the International Searching Authority PCT/IB2005/053465.

* cited by examiner

*Primary Examiner*—Mohammed Hasan

(57) ABSTRACT

An optical element is provided for generating interfacial waves by means of electro wetting. The optical element comprises a fluid chamber with at least one side wall and an optical axis. Furthermore the fluid chamber includes a first fluid (A) and a second fluid (B) which are separated by an interface, the fluids (A, B) being immiscible. A first electro wetting electrode and a second electro wetting electrode are provided, the first electro wetting electrode is separated from the first fluid (A) and the second fluid (B) by a fluid contact layer. The second electro wetting electrode is arranged to act on the first fluid (A). The selected standing or running waves can be formed by providing selected voltages to the first and the second electro wetting electrodes respectively.

28 Claims, 5 Drawing Sheets

OPTICAL ELEMENT, OPTICAL DEVICE, ATMOSPHERE PROVIDER, OPTICAL SCANNING DEVICE, LIGHT COUPLING DEVICE, AND METHOD OF OPERATING INTERFACIAL WAVES

The present invention relates to an optical element for providing interfacial waves by means of electro wetting, to optical devices including such optical elements, and to a method of operating interfacial waves.

A variable focus lens is described in U.S. Pat. No. 6,369,954 B1. This focus lens comprises a chamber filled with a first liquid, which is conductive, and a drop of a second liquid, which is an insulating liquid. The liquids are non miscible: the second liquid is held in a surface zone of a chamber wall. The drop is positioned in this zone by a fluid contact layer comprising a hydrophobic and hydrophilic part or layers. If a voltage is applied between electrodes in the chamber, the conductive liquid causes movements and deformations of the insulating drop in such a way that the surface of the drop becomes more convex. In one embodiment, the hydrophobic and hydrophilic layers are arranged along a cylindrical surface, with sides of the drop being positioned axially along the cylindrical surface and thereby centered, by the hydrophilic layer if no voltage is applied and by a series of axially spaced electrodes along the sides of the cylinder, if a voltage is applied.

A further variable focus lens having such an arrangement is described in the International Patent Application WO 00/58763. The proposed means for centering a drop of insulating liquid is a bell-mouthed recess formed of an insulating layer in an adjustable lens. The sides of the recess are arranged so as to keep the drop centered within the recess and to provide a convex lens in surface of the drop. Since the base of recesses is formed of the same material as the sides of the recess, such materials must be chosen to be transparent if the lens is to be operative.

It is an object of the present invention to provide an optical element for providing interfacial waves by using the phenomenon of electro wetting to create, for example continuously tunable optical gratings.

In a first aspect, the present invention provides an optical element for providing interfacial waves by means of electro wetting, the optical element comprising:
 a fluid chamber,
 the fluid chamber including a first fluid and a second fluid which are separated by an interface,
 the fluids being immiscible,
 a first electro wetting electrode and a second electro wetting electrode, the first electro wetting electrode is separated from the first fluid and the second fluid by an electrically insulating fluid contact layer, the second electro wetting electrode acting directly on or being capacitively coupled to the first fluid, and
 a voltage control system for varying a voltage difference between both electro wetting electrodes in time to create interfacial waves.

In such an optical element according to the invention, the shape of the interface (boundary layer or area between the fluids) between the first fluid and the second fluid may be changed by both electro wetting electrodes. The shape of the interface is variable and controllable. Under the application of variable voltage patterns applied across the configuration of a first electro wetting electrode and a second electro wetting electrode as a common electrode the contact angle of the interface between the two liquids and the first electro wetting electrode is changed. A varying contact angle in time leads to interfacial waves. Thus, more shapes, for example a continuously tunable optical grating, can be created.

In a preferred embodiment, the first electro wetting electrode is divided in at least two first electro wetting electrodes. One electro wetting electrode as an insulated electrode already produces waves but at least two electro wetting electrodes increase the number of possible waveforms, since different voltages on the first and the second electro wetting electrodes lead to different contact angles of the interface with the side wall of the fluid chamber.

In another aspect, the present invention provides an optical device comprising an optical element for providing interfacial waves by means of electro wetting. The optical device of this aspect of the invention may be an atmosphere provider for lighting applications to produce light and colour distribution around for instance a television set. In this way a more intensive impression for instance of a displayed movie can be obtained. The optical device of the present invention may also be an optical scanning device with an optical element according to the invention. This optical element is used to produce satellite spots on an information layer of an optical record carrier for crosstalk translation. Furthermore, the optical device of the present invention may also be a light coupling device for coupling out light, for example coupling out light of a light guide.

In a further aspect, the present invention provides a method of operating interfacial waves by means of electro wetting, the method comprising:
 providing a fluid chamber,
 filling the fluid chamber with a first fluid and a second fluid, the fluids being immiscible, such that the fluids are in contact over an interface,
 providing a first electro wetting electrode and a second electro wetting electrode, the first electro wetting electrode is separated from the first fluid and the second fluid by an electrically insulating fluid contact layer, the second electro wetting electrode acting on the first fluid, and
 varying a voltage difference between both electro wetting electrodes in time by a voltage control system to create interfacial waves.

Features and advantages of the invention will become apparent from the following description of preferred embodiments of the invention, given by way of example only and made with reference to the accompanying drawings, in which.

Figure 1:
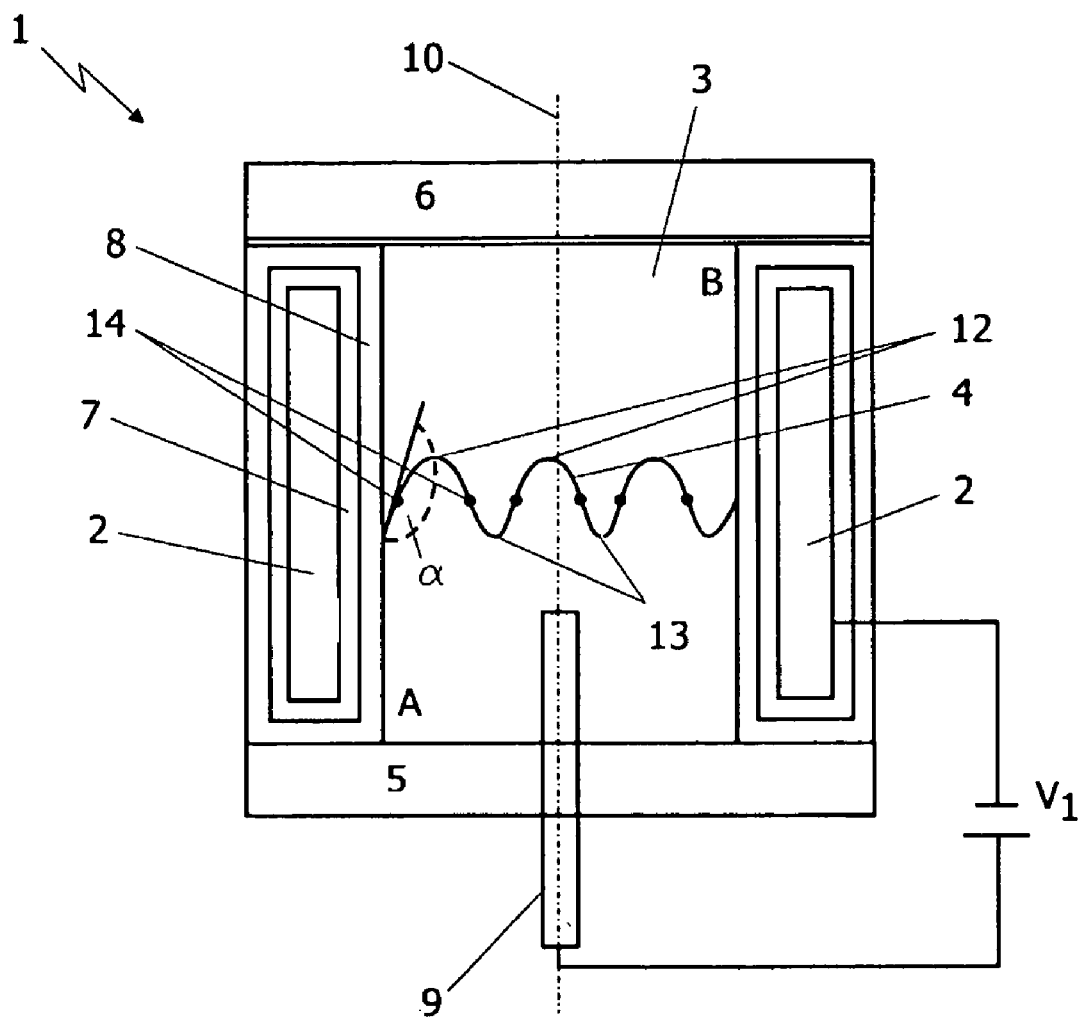
FIG. 1 shows a cross-sectional view of an optical element in accordance with a first embodiment of the present invention.

FIG. 1 shows an optical element 1 which is an electro wetting cell or an electro wetting device. Such electro wetting devices are devices utilizing the electro wetting phenomenon to operate. In electro wetting the three-phase contact angle, explained later, is changed by application of voltage. The three phases constitute two fluids and a solid. Typically at least one of the fluids is a liquid.

A fluid is a substance, which alters its shape in response to any force. So it tends to flow or to conform to the outline of its chamber and includes gases, vapours, liquids and mixtures of solids and liquids capable of flow.

The optical element 1 of FIG. 1 comprises a first electro wetting electrode 2 which is a single annular insulated electrode forming a capillary tube. Furthermore, the optical element 1 comprises a fluid chamber 3 containing a first fluid A and a second fluid B. The first fluid A and the second fluid B are in contact over an interface 4. The two fluids A and B consist of two immiscible liquids wherein the first fluid A is a conducting or polar liquid such as water containing a salt solution or a mixture of water and ethylene glycol. The second fluid B is an insulating liquid such as a silicon oil or an alkane. The two fluids A and B are preferably arranged to have an equal density, so as to minimize the gravitational effects between the two liquids. In this way the lens functions independently of orientation.

The two fluids A and B have different refractive indices. Depending on the amount of salt added to fluid A, the salt solution may vary in a refractive index between 1.33 and 1.50. Depending on the choice of the fluid B the refractive index of the fluid B may vary between 1.25 and 1.70.

The fluid chamber 3 is sealed by means of a transparent front element 5 and a transparent rear element 6. In this way light can enter and exit the fluid chamber 3 through the transparent elements 5 and 6 of the optical element 1.

The first electro wetting electrode 2 is formed from a metallic material and is coated with an insulating layer 7, for example of parylene. The insulating layer 7 has a thickness between 50 nm and 100 µm, with typical values between 1 µm and 10 µm. A fluid contact layer 8, which is a coating on the insulating layer 7, reduces the hysteresis in a contact angle α of the interface 4 with a wall of the fluid chamber 3. The fluid contact layer 8 is preferably formed from an amorphous fluorocarbons such as Teflon™ AF 1600 produced by DUPONT™. The AF 1600 coating may be produced by successive dip coating of the first electro wetting electrode 2, which forms a homogenous layer of material of substantially uniform thickness since the cylindrical sides of the electrode 2 are substantially parallel to the cylindrical electrode 2. Dip coating is performed by dipping the electrode 2 whilst moving the electrode 2 in and out of the dipping solution along its axial direction. The wettability of the fluid contact layer 8 by the first fluid A is essentially equal on both sides of the intersection of the interface 4 with the fluid contact layer 8 if no voltage is applied between the first and a second electro wetting electrodes. A second electro wetting electrode 9 is arranged at one end of the fluid chamber 3 in this case in the front element 5 and extends along an optical axis 10 of the fluid chamber 3, or may be placed as a ring in the fluid chamber 3 or may be a thin coating on the front element 5. The second electro wetting electrode 9 is in this case a transparent electrode and is arranged with at least one part in the fluid chamber 3 in such a way that the second electro wetting electrode 9 acts on the first fluid A. In this way the electro wetting electrode 9 is in direct contact with the conducting liquid A. It is also possible that the second electro wetting electrode 9 is not in direct contact with the fluid A, e.g. when the second electro wetting electrode 9 would be covered with an insulating coating. The second electro wetting electrode 9 would then be capacitively coupled with the fluid A. Furthermore it is possible that the electro wetting electrode 9 extends through the interface 4 along the optical axis 10 of the fluid chamber 3.

Electro wetting can be used to increase the wettability of the conducting fluid on a surface. The fluid contact layer 8 has a higher wettability in respect to the second fluid B than the first fluid A if no voltage is applied between the first electro wetting electrode 2 and the second electro wetting electrode 9. Due to electro wetting the wettability by the first fluid A varies under the application of a voltage between the first electro wetting electrode 2 and the second electro wetting electrode 9 which tends to change the contact angle α of the interface 4 at a three-phase line. The three-phase line is the line of contact between the fluid contact layer 8 and the two liquids A and B. The contact angle is defined as the angle α of the liquid/liquid interface with the insulated first electro wetting electrode 2, measured through the conducting liquid A. Thus, the shape of the interface 4 is variable in dependence on the applied voltage of a voltage control system providing a voltage $V_1$. A voltage difference between the second, common electro wetting electrode 9 which is in contact with the conducting liquid A and the insulated electro wetting electrode 2 changes the contact angle α of the interface 4 between the two liquids A and B. A varying contact angle α in time leads to interfacial waves whereas in this embodiment the contact angle α of the interface 4 with the wall of the fluid chamber 3 is equal along the whole wall of the fluid chamber 3. These interfacial waves may by standing waves or running waves with tunable amplitude and wavelength. Using the theory of Fourier transformation several arbitrary interfacial shapes may be created. Fourier transformation derives from Fourier analysis which states that any function f(x) defined within an interval or period can be represented as a series of sine and cosine functions. These sine and cosine functions are functions either in space or time. In other words: Fourier transformation is an extremely useful mathematical tool and the essence of Fourier transformation is that any function is a summation of many waves. These many waves can be generated by utilizing and controlling the voltage on the electro wetting electrodes 2 and 9.

In FIG. 1 the annular electro wetting electrode 2 may also be two separate electrodes. In this way, two electro wetting electrodes 2 increase the number of possible waveforms since different voltages $V_1$ and $V_2$ on the electro wetting electrodes 2 and 9 result in different contact angles α of the interface 4 with the wall of the fluid chamber 3.

Figure 2A:
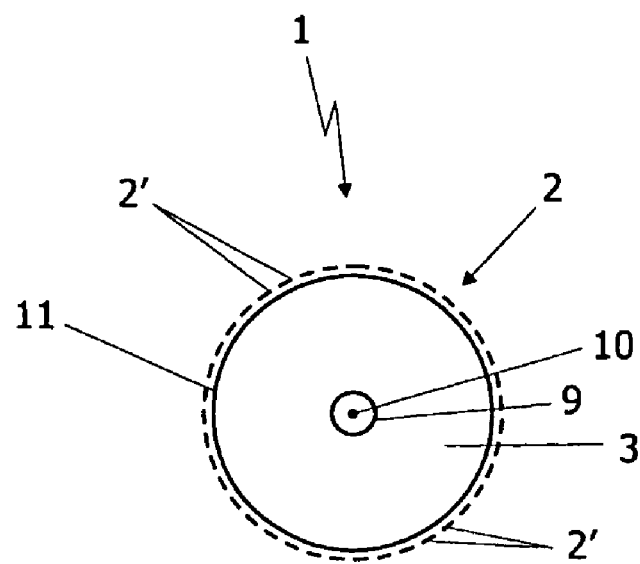
FIG. 2A shows a top view cross-section of an electro wetting electrode configuration for use in the optical element in accordance with an embodiment of the present invention.
Figure 2B:
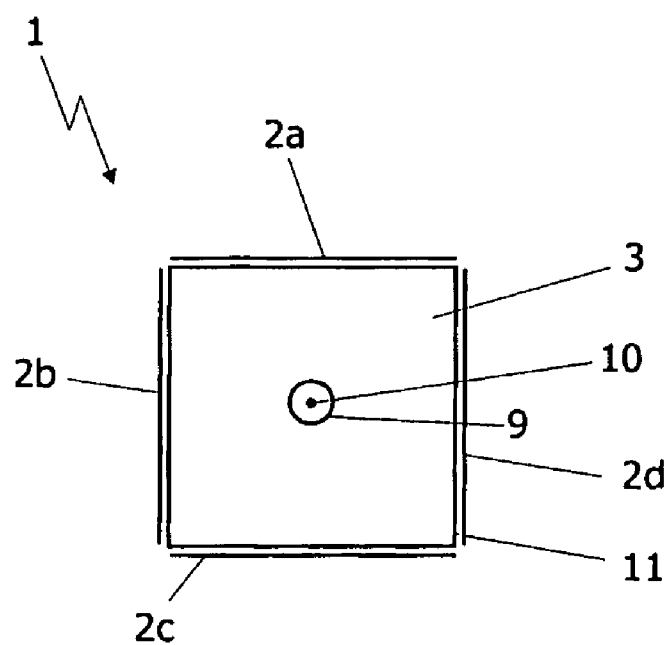
FIG. 2B shows a top view cross-section of an alternative electro wetting electrode configuration for use in the optical element according to an embodiment of the present invention.

In the above description, a single electro wetting electrode 2 has been described as acting on a perimeter of the interface 4. It will be appreciated that one or more of either electrodes may be provided. Thus, it is also possible to use several insulated electrodes as shown in FIGS. 2A and 2B. The more electrodes, the more waveforms can be made.

For instance, FIG. 2A shows a cross-sectional view from top of the optical element 1 perpendicular to the optical axis 10 of the fluid chamber 3. In this embodiment an alternative electro wetting electrode configuration is shown in connection with the fluid chamber 3. In FIG. 2A instead of a single annular electro wetting electrode 2 extending around the periphery of the fluid chamber 3 seventeen separate segment electrodes 2' spaced equally around the periphery of the fluid chamber 3 are provided. By applying individual and different voltages to each side wall segment electrode 2' and to the second, common electro wetting electrode 9 such an electro wetting electrode configuration achieves a variety of shapes of the interface 4 between the two liquids A and B.

FIG. 2B illustrates a cross-sectional view of a further embodiment of the optical element 1, in which four rectangular segment electrodes 2a, 2b, 2c and 2d are spaced about the optical axis 10 of the fluid chamber 3 along which the second electro wetting electrode 9 is arranged, in a square formation with their longitudinal edges parallel. A square fluid chamber 3 is thus formed. The inner surface of the segment electrodes 2', 2a, 2b, 2c, 2d is covered with the continuous uniform thickness electrically insulating fluid contact layer 11, formed for example of Teflon™ AF1600. The second electro wetting electrode 9 should be out of sight or transparent and may be arranged in the centre of the fluid chamber 3 along the optical axis 10, or off-centre, as required.

Referring to FIGS. 2A and 2B a voltage can be applied between the side wall segment electrodes 2' and 2a, 2b, 2c, 2d and the second electro wetting electrode 9. By combination of different applied voltages to the electrodes with a different contact angle between each electrode and the interface 4 a standing or a running wave is created. Depending on the application, between one and ten electrodes are preferred, between one and four electrodes are optimum. One electrode is easy to address and thus it may be used for low-cost applications. The result of these configurations of FIGS. 2A and 2B is that splitting up the annular electro wetting electrode 2 into many small electrodes, parallel with the optical axis 10, for instance 2' and 2a, 2b, 2c, 2d, leads to different contact angles $\alpha$, and thus more possibilities arise for creating special waveforms.

In a further embodiment of the optical element 1 it is also possible that only one electrode 2 is provided on one side wall of the fluid chamber 3. Then the wave creating by application of voltage to the electrodes is reflected on the opposite side wall of the fluid chamber 3. The opposite side wall of the fluid chamber 3 is a wave reflecting wall, so that the waves are reflected. Another possibility arises if the opposite side wall of the fluid chamber 3 contains a wave absorbing wall so that the waves are not reflected but absorbed. In this way it is easy to create running waves.

Furthermore, whilst the fluid chamber 3 has been described in FIG. 1 as a circular cylinder, it will be appreciated that the fluid chamber 3 can in fact be of any desired shape. The fluid chamber 3 may have other geometries besides circular such as cylindrical, elliptical, rectangular, torus-shaped, etc. The shape of the fluid chamber 3 depends on the application. In these embodiments a rectangular or a cylindrical fluid chamber 3 is preferred. The side walls of the fluid chamber 3 in FIG. 1 are arranged parallel to the optical axis 10. However, the side walls do not need to be parallel to the optical axis 10. For instance a rectangular or square fluid chamber may be a pyramid like fluid chamber and for instance a cylindrical fluid chamber may be a conical fluid chamber. These variations in the shape of the fluid chamber 3 lead to other waveforms and often allow creating larger wave amplitudes of standing or running waves. The waveforms do not only depend on the geometry of the fluid chamber but also on the electrode structure, the density and surface tension of the liquids A and B and the voltages applied on the electro wetting electrodes 2 and 9.

In a further embodiment of the optical element 1 at least one of the fluids A, B comprises light-reflecting particles (not shown). Said particles are treated such that they settle at the interface 4 between the fluids A and B, wherein the particles act as a mirror. Hence light-reflecting waves can be produced.

Referring now to FIG. 1, an embodiment of the present invention is to create standing or running waves. By periodically varying the voltage of the insulated electro wetting electrode 2 a standing or a running wave can be produced. Depending on how the voltage on the electro wetting electrode 2 is switched within one period, the shape of the standing or running wave is determined. The resulting structure of the standing or the running wave can be used as grating.

The interface 4 between the two fluids A and B is never completely still, but is time dependent. In the case of running waves, the waves run along the interface 4 in one direction. A standing wave is defined as being the sum of two running waves and provides points described as nodes 14 on which the amplitude of the interfacial waves are always 0. Nodes 14 always lay in the distance of a half wavelength. The extremes of the amplitudes are described as antinodes 12, 13. On the nodes the interface 4 is in rest. On the antinodes 12, 13, the interface 4 moves up and down. In FIG. 1 the interface 4 between the two fluids A and B describes a grating at a certain moment in time. Note that a half period of the oscillation time later, upper antinodes 12 will be down and low antinodes 13 will be up. Nodes 14 remain at their places. A quarter period of the oscillation time later, the interface 4 is flat. Thus, the shape of the grating is time-dependent. Note furthermore that waves are usually not square in shape and hence the grating composed of waves is not perfect. The shape of the wave, for example square, sine-shaped etc., determines the efficiency of the grating. The distance between the nodes 14 determines the grating constant. Thus, it is possible to create a continuously tunable grating. It might be a problem for some applications that the standing wave antinodes 12, 13 move up and down. By coupling a light source triggering to the wave generating voltage control system the light source can be made to work only when the antinodes are in certain positions. This is advantageous for the output of the diffracted light.

A standing wave is generated if in the fluid chamber 3 accommodates an integer times half of the wavelength. A running wave is generated if for example two electrodes 2 on each side of the fluid chamber 3 generate different voltages or if the wavelength $\lambda$ of the interfacial wave does not meet the criteria for generation of standing waves in the fluid chamber 3. The main purpose of such a continuously tunable optical grating is to provide an atmosphere provider in lighting applications, but such a device may also be utilized in other applications.

An atmosphere provider is for instance a television set (TV set) which produces, besides the transmission of motion pictures, light distribution and colour distribution around the TV set. This improves the experience for instance of the displayed movie or of sport events. To do this there are already different ways to change the light distribution. However, these devices and methods are mostly mechanically based and cost-intensive. Moreover these devices are also susceptible to wear and the number of possible light distribution configurations is limited.

Figure 3A:
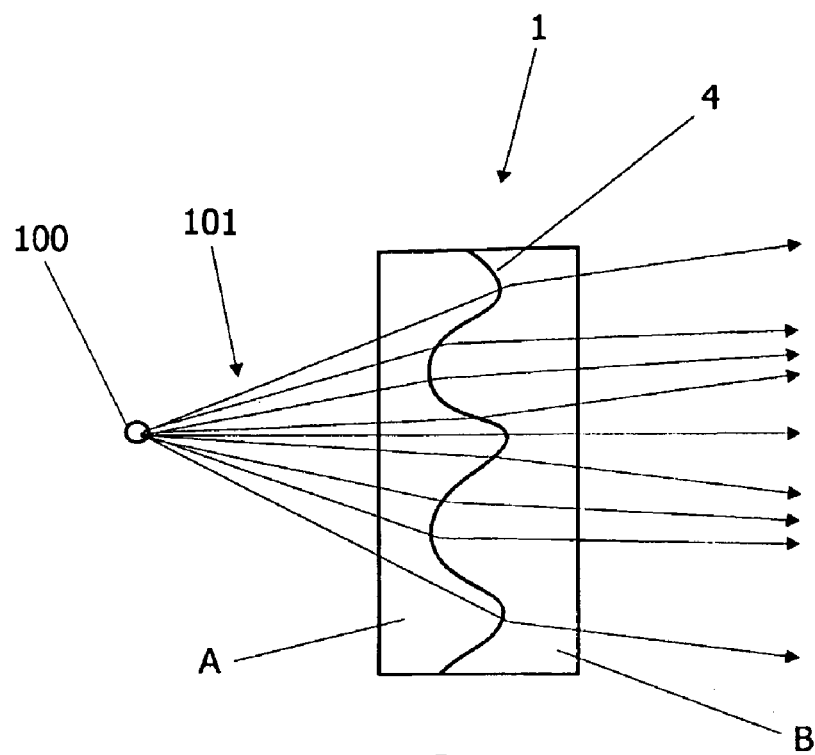
FIGS. 3A, 3B show a part of an atmosphere provider in accordance with an embodiment of the present invention in a schematic cross-section.
Figure 3B:
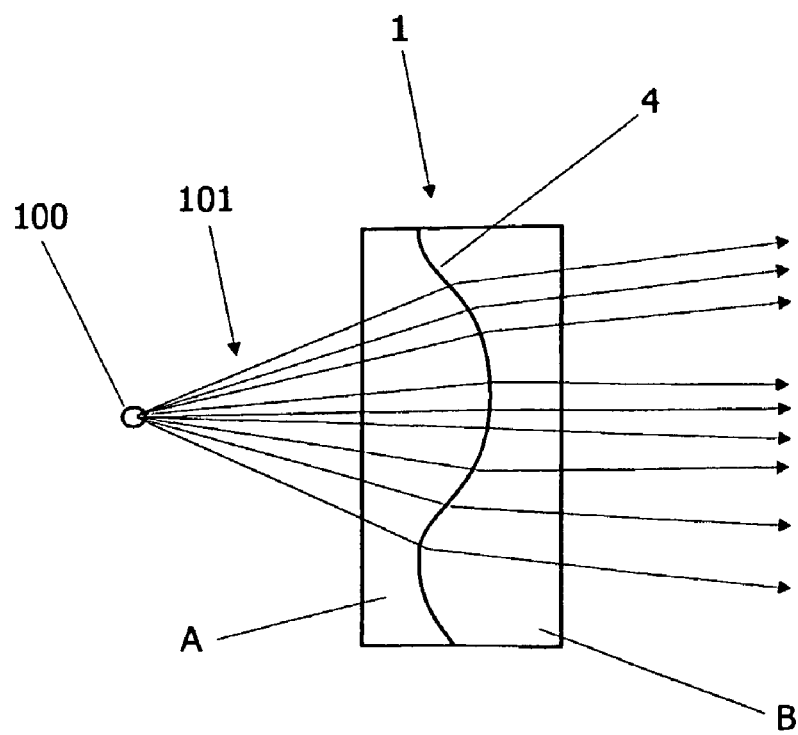

In FIGS. 3A and 3B only a part of an atmosphere provider is shown, i.e. that only the most important part for the invention is shown. The optical element 1 which has the same construction as the optical element of FIG. 1 and hence the same reference is arranged in front of a light emitting diode (LED) 100. This LED 100 emits for instance white light 101 because the LED 100 is manufactured of three emitters, which emit different wavelength and hence different light colours. Thus, this composition creates white light. It is also possible to use more than one LED and/or also more than one optical element. It is also possible to use one LED of any colour. It is preferred to use three LEDs (red, green, blue) since by this way by changing the light intensity all kinds of colours may be produced.

As already mentioned, an interfacial wave can be created at the interface 4 between the two immiscible liquids A and B. In this embodiment the possible wave modes also depend on the geometry of the surrounding walls of the fluid chamber, the electrode structure and the voltage applied on the electrodes. By arranging the optical element 1 in front of the LED 100, wherein in the FIGS. 3A and 3B the same construction of the most important part of the atmosphere provider is shown, however, the wave modes of the interface 4 are different between both figures (in other words: different wave modes in one optical element in front of one LED may be produced), it is possible to provide various light distributions depending on the mode addressed. The modes can either be standing waves or running waves. In both cases the light distribution is not fixed. In case of a standing wave the light distribution on a wall of a room around the TV set remains substantially fixed in position, however, may change in light intensity in time in the same way as the standing wave changes. That means that the light spot of the LED 100 does not move on the wall, it remains more or less in one position. However, the light spot goes more or less up and down as the antinodes of the standing wave. In case of a running wave the light spot on the wall flows along the wall as the running wave runs along the interface 4.

Depending on the oscillation time the spot or image produced can either be averaged out by the human eye during a fast oscillation time (the human eye can only resolve to the flicker-fusion frequency) or can be visible for the human eye during a slow oscillation time. Thus, for fast oscillation times the light distribution is observed as being fixed.

Note in this embodiment, if the two immiscible liquids A and B have the same refractive index but different transmission properties the thickness variations of the two liquids which are caused by the interfacial waves may also induce differences in light distribution on the wall on which the light spot is sent.

In case of a TV set as the atmosphere provider, the LED(s) in combination with the optical element(s) is (are) arranged at the boundary of the TV set. Created light pulses produce light around the TV set. It is also possible that the light and the colour distributions are coupled to the scene displayed on the TV or to the type of program.

By varying the modes of each optical element 1 in combination with varying the light intensity of each LED 100 a low-cost light device with no movable parts is achieved. Naturally, it is also possible to provide other devices as atmosphere providers, for example a computer.

Figure 4:
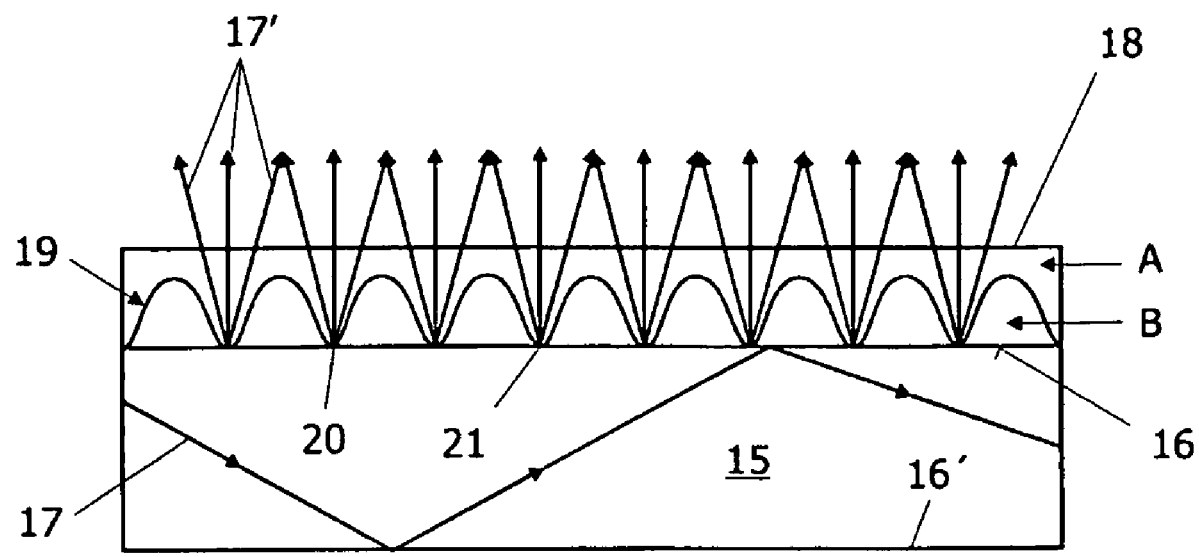
FIG. 4 shows a light coupling device in accordance with an embodiment of the present invention in a schematic cross-section.

In another embodiment of the present invention, the optical element 1 is provided in a light coupling device according to FIG. 4. The light coupling device comprises a light source for generating a light beam and at least one light guide for transmitting light from the light source to a location. In FIG. 4 only one light guide 15 is shown. The construction of the light guide 15 is not described here in detail, because light guides are well known from prior art documents. The light guide 15 is constructed in such a way, that light is totally reflected on side walls 16 and 16' of the light guide 15. In this example only one totally reflected light beam 17 is shown in the light guide 15. Total reflection occurs if the incidence angle of a light beam is higher as the critical angle of the total reflection and the reflection occurs within the light guide 15 providing an optically denser medium at a surface against an optically rarer medium. The optically rarer medium, as in this example air, has a lower refractive index than the refractive index of the light guide 15.

The light guide 15 is coupled to an optical element 18 described in FIG. 1. The optical element 18 has the same construction as the optical element 1 of FIG. 1. However, the liquid level of the fluids A and B is lower so that waves 19 can touch the bottom of the optical element 18 and hence also the side wall 16 of the light guide 15. The fluid A is an electrically insulating liquid such as a silicone oil or an alkane. The fluid B is an electrically conducting liquid such as water or water containing a salt solution. The refractive index of the fluid A may vary between 1.25 and 1.70 whereas the refractive index of the fluid B varies between 1.33 and 1.50. The fluids in this embodiment are selected in such a way that the fluid A has a large refractive index and the fluid B has a low refractive index.

In order to couple out light out of the light guide 15, a running wave 19 along the fluid A/fluid B interface have to be introduced in such a way that the amplitude of the running wave 19 is large enough to touch the light guide 15 at the side wall 16 as shown in FIG. 4. At each place, for instance at the places 20 and 21, where the light guide 15 is touched by the wave the light 17' can couple out because at those places total internal reflection no longer occurs. In another example it is possible that the amplitude of the wave varies in time. Thus, one scanning line can be produced. This means that the electrode of the optical element 18 described in more detail in FIG. 1 can only generate one single wave. One running wave is then produced instead of a series of running waves. By means of this device of FIG. 4 light can be coupled out in a better and economic way.

This example is particularly provided in the backlight of LC-displays or in lighting applications.

Figure 5:
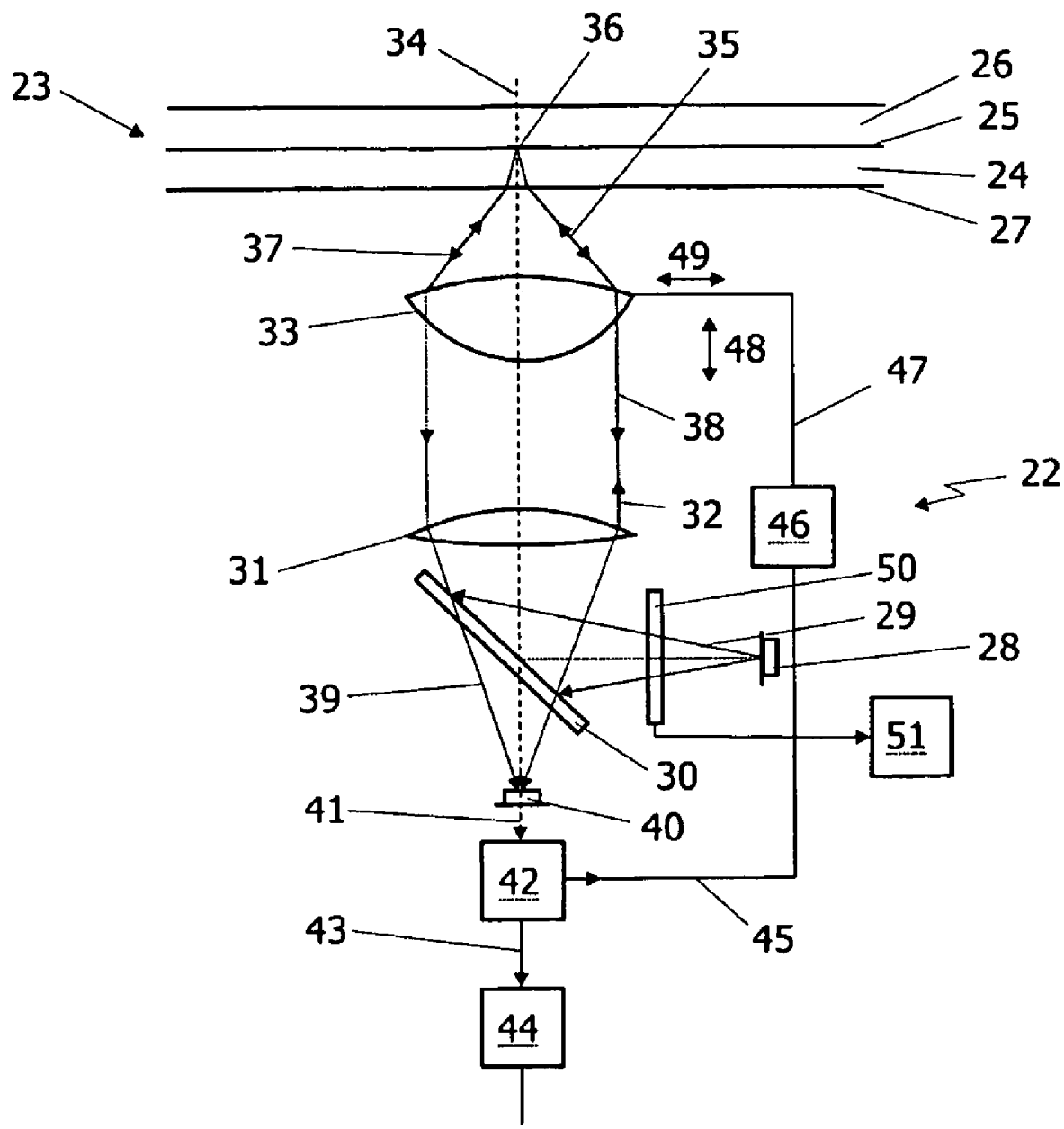
FIG. 5 shows an optical scanning device in accordance with an embodiment of the present invention in a schematic cross-section.

FIG. 5 shows an optical scanning device 22 for scanning an optical record carrier 23. The record carrier 23 comprises a transparent layer 24 on one side of which an information layer 25 is arranged. The side of the information layer 25 facing away from the transparent layer 24 is protected from environmental influences by a protection layer 26. The side of the transparent layer 24 facing the optical scanning device 22 is called the entrance face 27. The transparent layer 24 acts as a substrate for the record carrier 23 by providing mechanical support for the information layer 25. Alternatively, the transparent layer 24 may have the sole function of protecting the information layer 25, while the mechanical support is provided by a layer on the other side of the information layer 25 for instance by the protection layer 26 or by a further information layer and transparent layer connected to the information layer 25. Information may be stored in the information layer 25 of the record carrier 23 in the form of optically detectable marks arranged in substantially parallel, concentric or spiral tracks, not indicated in FIG. 5. The marks may be in any optically readable form, e.g. in the forms of pits or areas with a reflection coefficient or a direction of magnetisation different from their surroundings or a combination of these forms.

The scanning device 22 comprises a radiation source 28, for example a semiconductor laser, emitting a diverging radiation beam 29. A beam splitter 30 reflects the radiation beam 29 towards a collimator lens 31. The collimator lens 31 converts the diverging beam 29 into a collimated beam 32. The collimated beam 32 is incident on an objective system 33.

The objective system 33 may comprise one or more lenses or a grating. Furthermore the objective system 33 comprises an optical axis 34 and changes the collimated beam 32 to a converging beam 35 incident on the entrance face 27 of the record carrier 23. The converging beam 35 forms a scanning spot 36 on the information layer 25. Radiation reflected by the information layer 25 forms a diverging beam 37 transformed into a substantially collimated beam 38 by the objective system 33 and subsequently into a converging beam 39 by the collimator lens 31. The beam splitter 30 separates the forward and the reflected beams 29 and 39 by transmitting at least part of the converging beam 39 towards a detection system 40. The detection system 40 captures the radiation and converts it into electrical output signals 41. A signal processor 42 converts these output signals 41 to various other signals. One of the signals is an information signal 43, the value of which represents information read out from the information layer 25. The information signal 43 is processed by an information-processing unit for error correction 44. Other signals from the signal processor 42 are the focus error signal and radial error signal 45. The focus error signal represents the axial difference in height between the scanning spot 36 and the information layer 25. The radial error signal represents the distance in the plane of the information layer 25 between the scanning spot 36 and the center of a track in the information layer 25 to be followed by the scanning spot 36. The focus error signal and the radial error signal 45 are fed into a circuit 46 converging these signals to servo control signals 47 for controlling a focus actuator and a radial actuator, respectively. The actuators are not shown in FIG. 4. The focus actuator controls the position of the objective system 33 in the focus direction 48, whereby controlling the actual position of the scanning spot 36 such that it coincides substantially with the plane of the information layer 25. The radial actuator controls the position of the objective system 33 in a radial direction 49, whereby controlling the radial position of the scanning spot 36 in such a way that it coincides as much as possible with the central line of track to be followed in the information layer 25. The tracks in FIG. 5 run in the direction perpendicular to the plane of the figure.

In this embodiment the optical scanning device 22 of FIG. 5 may also be adapted to scan a second type of record carrier having a thicker transparent layer then the record carrier 23. The optical scanning device 22 may also use the radiation beam 29 or a radiation beam having a different wavelength for scanning the record carrier of the second type. The numerical aperture of this radiation beam may be adapted to the type of record carrier. The spherical aberration compensation of the objective system 33 must be adapted accordingly.

Furthermore in FIG. 5, an optical element 50 similar to the one described in relation to FIGS. 1, 2a and 2b is provided. This optical element 50 is arranged in the optical radiation, preferably between the radiation source 28 and the beam splitter 30. A voltage control system 51 is provided for applying the selected voltages to the electrodes of the optical element 50 in dependence on the information layer 25 currently being scanned. In this embodiment the fluid chamber of the optical element 50 is of rectangular shape. The first electro wetting electrode similar to the first electro wetting electrode 2 in relation to FIG. 1 at a wall of the fluid chamber is periodically addressed to obtain a standing wave of the flat interface between the first and the second fluids. The standing wave provides a linear grating of a certain contact-angle. In this way it is possible to create a tunable linear grating. This grating is used to create adjacent spots (satellite spots) to the central scanning spot 36. These satellite spots filter out the wrong information from the central scanning spot 36. Thus, the satellite spots are used to read out for crosstalk translation.

It is also possible that the optical element 50 is a tunable wavefront modifier capable of generating asymmetric wavefront modifications such as coma and astigmatism. With the optical element 50 as wavefront modifier it is possible to compensate the coma caused by the amount of tilt of the optical record carrier 23. The astigmatism required if the objective system 43 is off-centered, can also be introduced by the wavefront modifier according to the invention.

Such an optical element 50 as illustrated in FIG. 1 and in FIG. 5 respectively can be used to produce satellite spots for crosstalk translation or a range of desired aberrations, to offset undesired aberrations. By providing an optical element as described in FIGS. 1 and 5 a cheap operation compensation device may be provided and it will be appreciated that such an optical element can be incorporated into a range of optical devices.

If the transmission of the liquids A and B is different and interfacial waves are present or created respectively, then this also results in light intensity variations on a wall of room by using an atmosphere provider, respectively.

The above embodiments are to be understood as illustrative examples of the present invention. It is also to be understood that any features described in relation to one embodiment may also be used in other of the embodiments and other optical devices.

It will be clear that any reference signs in the claims shall not be construed as limiting the scope.

The invention claimed is:

1. An optical element for providing interfacial waves by means of electro wetting, the optical element comprising:
   a fluid chamber,
   the fluid chamber including a first fluid and a second fluid which are separated by an interface,
   the fluids being immiscible,
   a first electro wetting electrode and a second electro wetting electrode, the first electro wetting electrode being separated from the first fluid and the second fluid by an electrically insulating fluid contact layer, the first electro wetting electrode being a singular annular insulated electrode forming a capillary tube extending around the periphery of the fluid chamber, the second electro wetting electrode acting directly on or being capacitively coupled to the first fluid, and
   a voltage control system for varying a voltage difference between both electro wetting electrodes in time to create interfacial waves at the interface between the two immiscible liquids, wherein said interfacial waves comprise one of standing waves or running waves with tunable amplitude and wavelength.

2. An optical element as claimed in claim 1, wherein the fluids have different refractive indices.

3. An optical element as claimed in claim 1, wherein the fluids have the same refractive index, the transmission propelties of the fluids are different.

4. An optical element as claimed in claim 1, wherein the first fluid is a conducting liquid and the second fluid (B) is an insulating liquid.

5. An optical element as claimed in claim 1, wherein the interfacial waves are standing waves, or running waves.

6. An optical element as claimed in claim 1, wherein the first electro wetting electrode is divided in at least two first electro wetting electrodes.

7. An optical element as claimed in claim 6, wherein the at least two first electro wetting electrodes are oppositely arranged at a distance from each other and on a perimeter of the fluid chamber, the electro wetting electrodes being arranged substantially perpendicular to at least one other electro wetting electrode.

8. An optical element as claimed in claim 6, wherein at least two electro welling electrodes are arranged in a circular, oval, or elliptical, shape on a perimeter of the fluid chamber.

9. An optical element as claimed in claim 1, wherein one electro wetting electrode on one side wall of the fluid chamber and on an opposite side wall of the fluid chamber an absorbing wall is provided, wherein the interfacial waves creating by application of voltage to the electro wetting electrodes are absorbed at the absorbing wall.

10. An optical element as claimed in claim 1, wherein the first fluid and the second fluid have the same density.

11. An optical element as claimed in claim 1, wherein the optical element is adapted in such a way that an optical grating is created.

12. An optical element as claimed in claim 1, wherein at least one of the fluids comprises light-reflecting particles.

13. An optical device with an optical element as claimed in claim 1.

14. An optical device as claimed in claim 13, wherein a light source of the optical device is triggering coupled to the voltage control system of the optical element.

15. An atmosphere provider for lighting application comprising at least one light source and at least one optical element as claimed in claim 1 to produce various light and colour distribution.

16. An atmosphere provider as claimed in claim 15, wherein the at least one light source is a light emitting diode (LED), the at least one optical element is arranged in front of said light emitting diode.

17. An optical scanning device for scanning an information layer of an optical record carrier, the device comprising a radiation source for generating a radiation beam, an objective system for converging the radiation beam on the information layer and an optical element as claimed in claim 1.

18. An optical scanning device as claimed in claim 17, wherein the optical element is used to produce satellite spots on the information layer for crosstalk translation.

19. An optical scanning device as claimed in claim 17, wherein the optical element is an optical wavefront modifier for modifying a wavefront of the radiation beam passing through the wavefront modifier.

20. A light coupling device for coupling out light, the device comprising a light source for generating a light beam, at least one light guide for transmitting light from the light source to a location and an optical element as claimed in claim 1.

21. A light coupling device as claimed in claim 20, wherein the interfacial wave is a running wave.

22. A method of operating interfacial waves by means of electro wetting, the method comprising:
    providing a fluid chamber,
    filling the fluid chamber with a first fluid and a second fluid, the fluids A and B being immiscible, such that the fluids are in contact over an interface,
    providing a first electro wetting electrode and a second electro wetting electrode, ), the first electro wetting electrode being a singular annular insulated electrode forming a capillary tube extending around the periphery of the fluid chamber, the first electro wetting electrode is separated from the first fluid and second fluid by an electrically insulating fluid contact layer, the second electro wetting electrode acting directly on or being capacitively coupled to the first fluid, and
    varying a voltage difference between both electro wetting electrodes in time by a voltage control system to create interfacial waves at the interface between the two immiscible liquids and, wherein said interfacial waves comprise one of standing waves or running waves with tunable amplitude and wavelength.

23. A method as claimed in claim 22, wherein the fluids have different refractive indices.

24. A method as claimed in claim 22, wherein the fluids have the same refractive index, the transmission properties of the fluids are different.

25. A method as claimed in claim 22, wherein the first fluid is a conducting liquid and the second fluid is an insulating liquid.

26. A method as claimed in claim 22, wherein the first fluid and the second fluid have the same density.

27. A method as claimed in claim 22, wherein at least one of the fluids comprises light-reflecting particles.

28. An optical element for providing interfacial waves by means of electro wetting, the optical element comprising:
    a fluid chamber,
    The fluid chamber including a first fluid and a second fluid which are separated by an interface,
    the fluids being immiscible,
    a first electro wetting electrode and a second electro wetting electrode, the first electro wetting electrode being separated from the first fluid and the second fluid by an electrically insulating fluid contact layer, the first electro wetting electrode being a singular annular insulated electrode forming a capillary tube extending around the periphery of the fluid chamber, the second electro wetting electrode acting directly on or being capacitively coupled to the first fluid, and
    a voltage control system for varying a voltage difference between both electro wetting electrodes in time to create interfacial waves at the interface between the two immiscible liquids and, wherein said interfacial waves comprise one of standing waves or running waves with tunable amplitude and wavelength
    wherein one electro wetting electrode on one side wall of the fluid chamber and on an opposite side wall of the fluid chamber an absorbing wall is provided, wherein the interfacial waves creating by application of voltage to the electro wetting electrodes are absorbed at the absorbing wall.

* * * * *